(12) United States Patent

Salzinger et al.

(10) Patent No.: US 12,399,676 B2
(45) Date of Patent: Aug. 26, 2025

(54) ELECTRONIC DEVICE HAVING A VIRTUAL ASSISTANT FOR ADJUSTING AN OUTPUT SOUND LEVEL OF THE ELECTRONIC DEVICE BASED ON A DETERMINED SOUND LEVEL OF A REFERENCE SOUND INPUT

(71) Applicant: ACTU8 LLC, Brooklyn, NY (US)

(72) Inventors: John Salzinger, Brooklyn, NY (US); Seungah Jeong, Brooklyn, NY (US)

(73) Assignee: ACTU8 LLC, Brooklyn, NY (US)

( * ) Notice: Subject to any disclaimer, the term of this patent is extended or adjusted under 35 U.S.C. 154(b) by 278 days.

(21) Appl. No.: 18/300,940

(22) Filed: Apr. 14, 2023

(65) Prior Publication Data

US 2023/0333810 A1 Oct. 19, 2023

Related U.S. Application Data

(60) Provisional application No. 63/331,571, filed on Apr. 15, 2022.

(51) Int. Cl.
*G10L 15/08* (2006.01)
*G06F 3/16* (2006.01)

(52) U.S. Cl.
CPC .............. *G06F 3/165* (2013.01); *G06F 3/167* (2013.01)

(58) Field of Classification Search
CPC .......... G06F 3/017; G06F 3/165; G06F 3/167; G06V 40/169; G10L 15/08; G10L 15/22; G10L 17/24; G10L 25/48; G10L 25/51; G10L 15/30; H03G 3/3005; H04R 3/00; H04R 3/005; H04R 3/04; A61N 1/3993; G10H 1/365; G10H 5/005; H04M 1/026
See application file for complete search history.

(56) References Cited

U.S. PATENT DOCUMENTS

| | | | |
|---|---|---|---|
| 10,872,617 B2 * | 12/2020 | Shin ........................ | G10L 25/48 |
| 2002/0120455 A1 * | 8/2002 | Nakata .................... | G06F 3/167 |
| | | | 704/E15.04 |
| 2014/0222436 A1 * | 8/2014 | Binder .................... | G10L 17/24 |
| | | | 704/275 |
| 2015/0143978 A1 * | 5/2015 | Oh .......................... | G10H 5/005 |
| | | | 84/692 |
| 2015/0326196 A1 * | 11/2015 | Park ........................ | H03G 3/3005 |
| | | | 381/107 |
| 2017/0243576 A1 * | 8/2017 | Millington .............. | G10L 15/30 |
| 2017/0287291 A1 * | 10/2017 | Wang ..................... | H04M 1/026 |
| 2018/0097493 A1 * | 4/2018 | Weksler ................... | H04R 3/04 |
| 2018/0192214 A1 * | 7/2018 | Starobin ................. | G06F 3/167 |
| 2018/0321905 A1 * | 11/2018 | Fountaine ............... | G06F 3/165 |
| 2020/0009395 A1 * | 1/2020 | Smith ................... | A61N 1/3993 |
| 2020/0034108 A1 * | 1/2020 | Mozer .................... | G06F 3/167 |
| 2020/0176017 A1 * | 6/2020 | Hwang ................. | G10H 1/365 |

(Continued)

*Primary Examiner* — Gerald Gauthier

(74) *Attorney, Agent, or Firm* — Bookoff McAndrews, PLLC

(57) ABSTRACT

An electronic device may include a memory configured to store instructions; and a processor configured to execute the instructions to: receive a user command for a virtual assistant application of the electronic device to set an output sound level of the electronic device; receive a reference sound input based on the user command; determine a sound level of the reference sound input; and set the output sound level of the electronic device based on the determined sound level of the reference sound input.

20 Claims, 6 Drawing Sheets

(56) References Cited

U.S. PATENT DOCUMENTS

| | | | | |
|---|---|---|---|---|
| 2020/0310751 A1* | 10/2020 | Anand | ............... | H04R 1/1041 |
| 2020/0329311 A1* | 10/2020 | Kalathur | ............... | G06F 3/017 |
| 2020/0364026 A1* | 11/2020 | Lee | ............... | G10L 25/51 |
| 2020/0404424 A1* | 12/2020 | Alameh | ............... | H04R 3/005 |
| 2021/0118438 A1* | 4/2021 | Clarke | ............... | G10L 15/22 |
| 2021/0134291 A1* | 5/2021 | Kim | ............... | G06F 3/167 |
| 2021/0159867 A1* | 5/2021 | De Assis | ............... | G06V 40/169 |
| 2021/0256974 A1* | 8/2021 | Boettger | ............... | G10L 15/08 |
| 2022/0239269 A1* | 7/2022 | Min | ............... | G06F 3/167 |
| 2022/0269473 A1* | 8/2022 | Robert Jose | ............... | G06F 3/167 |
| 2023/0154460 A1* | 5/2023 | Norton, Jr. | ............... | G06F 3/167 |
| | | | | 704/275 |
| 2023/0186911 A1* | 6/2023 | Sundram | ............... | G06F 3/167 |
| | | | | 704/275 |
| 2023/0333810 A1* | 10/2023 | Salzinger | ............... | G06F 3/165 |
| 2024/0388823 A1* | 11/2024 | Poole | ............... | H04R 3/00 |

\* cited by examiner

ELECTRONIC DEVICE HAVING A VIRTUAL ASSISTANT FOR ADJUSTING AN OUTPUT SOUND LEVEL OF THE ELECTRONIC DEVICE BASED ON A DETERMINED SOUND LEVEL OF A REFERENCE SOUND INPUT

CROSS-REFERENCE TO RELATED APPLICATION

This patent application claims the benefit of priority to U.S. Provisional Application No. 63/331,571, filed on Apr. 15, 2022, the entirety of which is incorporated herein by reference.

TECHNICAL FIELD

The present disclosure relates to an electronic device having a virtual assistant. More particularly, the present disclosure relates to an electronic device that is configured to set an output sound level of the electronic device based on a user command for a virtual assistant application of the electronic device to set the output sound level of the electronic device and a reference sound input.

BACKGROUND

A virtual assistant application (e.g., an intelligent virtual assistant, an intelligent personal assistant, a virtual agent, a chatbot, etc.) is software that performs tasks or services based on a user command of a user. An electronic device (e.g., a smartphone, a wearable device, a smart speaker, etc.) may include a virtual assistant that receives a user command of a user, and performs a requested task or service based on the user command of the user (e.g., adjusts a setting of the electronic device, sends a message, answers a query, plays media, etc.).

As an example, a user may provide a user command to the virtual assistant application of the electronic device, and the virtual assistant of the electronic device may output a response based on the user command. For instance, the user may provide a user command of "what is the temperature today?" to the virtual assistant application of the electronic device, and the virtual assistant application of the electronic device may output a response of "the temperature is 75 degrees." The electronic device outputs the response in accordance with a set output sound level of the electronic device.

In some cases, the output sound level of the electronic device may be different than an intended, desired, or actual sound level of the user. For example, the user might be located in a quiet environment, and might speak quietly to provide the user command. If the electronic device outputs a response at a high output sound level, the user might be discomforted, and/or the quiet environment might be disturbed. As another example, the user might be located in a loud environment, and might speak loudly to provide the user command. If the electronic device outputs a response at a low output sound level, the user might be unable to comprehend the response. In this case, the user might be required to manually adjust an output sound level of the electronic device, and repeat the user command. Accordingly, additional computational resources of the electronic device might be consumed.

In some cases, the user might adjust, or set, an output sound level of the electronic device by providing a user command, to the virtual assistant application of the electronic device, that includes a specific request to adjust the output sound level to a specific delineated output sound level. For example, the user might provide a user command of "set the output sound level to 5." In response, the electronic device may set the output sound level of the electronic device to an output sound level corresponding to "5." However, the set output sound level might be different than an intended, or desired, sound level of the user. For instance, the user might have difficulty ascertaining exactly how loud the output sound level "5" is, and might have intended to set the output sound level to an output sound level that corresponds to an output sound level of "3." In this case, the user might be required to provide at least one additional user command that requests the virtual assistant of the electronic device to lower the output sound level. Accordingly, additional computational resources of the electronic device are consumed.

In some cases, the user might adjust an output sound level of the electronic device by providing a user command, to the virtual assistant application of the electronic device, that includes a request to lower or raise the output sound level. In response, the electronic device can lower or raise the output sound level. If the lowered or raised output sound level is not the intended, or desired, output sound level, then the user might provide at least one additional user command to the virtual assistant of the electronic device. Accordingly, additional computational resources of the electronic device are consumed.

As such, there is a need for a technique that more accurately and efficiently sets, or adjusts, an output sound level of an electronic device based on a user command for the virtual assistant application of the electronic device to set the output sound level of the electronic device and a determined sound level of a reference sound input.

SUMMARY

According to an example embodiment, an electronic device may include a memory configured to store instructions; and a processor configured to execute the instructions to: receive a user command for a virtual assistant application of the electronic device to set an output sound level of the electronic device; receive a reference sound input based on the user command; determine a sound level of the reference sound input; and set the output sound level of the electronic device based on the determined sound level of the reference sound input.

According to an example embodiment, a method may include receiving a user command for a virtual assistant application of an electronic device to set an output sound level of the electronic device; receiving a reference sound input based on the user command; determining a sound level of the reference sound input; and setting the output sound level of the electronic device based on the determined sound level of the reference sound input.

According to an example embodiment, a non-transitory computer-readable medium may store instructions that, when executed by a processor of an electronic device, cause the processor to: receive a user command for a virtual assistant application of the electronic device to set an output sound level of the electronic device; receive a reference sound input based on the user command; determine a sound level of the reference sound input; and set the output sound level of the electronic device based on the determined sound level of the reference sound input.

BRIEF DESCRIPTION OF THE DRAWINGS

The accompanying drawings, which are incorporated in and constitute a part of this specification, illustrate example embodiments of the present disclosure and together with the description, serve to explain the principles of the disclosure.

DETAILED DESCRIPTION

The present disclosure relates to an electronic device that is configured to set, or adjust, an output sound level of the electronic device based on a user command for a virtual assistant application of the electronic device to set the output sound level of the electronic device and a determined sound level of a reference sound input.

As described above, an electronic device might output sound at an output sound level that is different than an intended, desired, or actual sound level of the user. In such situations, the user may be required to provide additional user commands to the virtual assistant application of the electronic device to adjust the output sound level to comport with the intended, desired, or actual sound level of the user. In this way, the electronic device operates in a manner that deviates from an intended operation, and requires additional user intervention to adjust the operation of the electronic device. Moreover, in this way, additional computational resources are consumed in order to adjust the operation of the electronic device.

Some embodiments herein provide an electronic device that sets an output sound level of the electronic device based on a user command for a virtual assistant application of the electronic device to set the output sound level of the electronic device and a determined sound level of a reference sound input. Accordingly, the electronic device may output sound at an output sound level that more accurately aligns with a preferred, intended, or actual sound level of the user. As such, the user may set the output sound level of the electronic device by merely providing a user command that identifies a reference sound input. Moreover, in this way, the foregoing technique reduces a number of instances in which the electronic device outputs sound at an output sound level that significantly differs from an actual sound level of a user, and/or reduces a number of instances in which a user is required to provide additional user commands requesting adjustment of the output sound level of the electronic device. Accordingly, the embodiments herein improve the functionality of electronic devices and virtual assistant applications thereof, and improve the utilization of computational resources of electronic devices and virtual assistant applications thereof.

Figure 1:
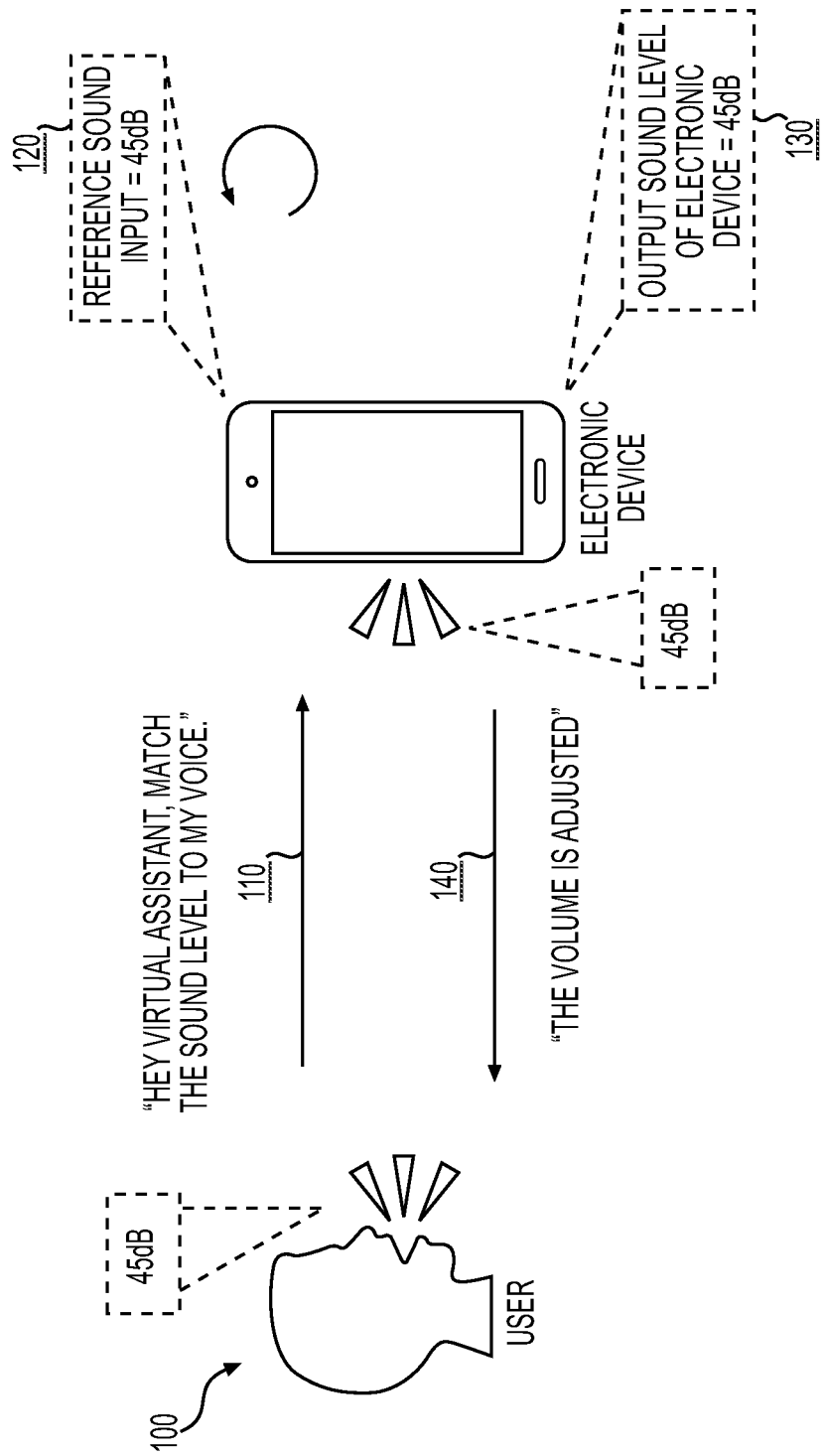
FIG. 1 is a diagram of an overview 100 for setting an output sound level of an electronic device based on a user command for a virtual assistant application of the electronic device to set the output sound level of the electronic device and a determined sound level of a reference sound input.

FIG. 1 is a diagram of an overview 100 for setting an output sound level of an electronic device based on a user command for a virtual assistant application of the electronic device to set the output sound level of the electronic device and a determined sound level of a reference sound input.

As shown by reference number 110, the electronic device may receive a user command for a virtual assistant application of the electronic device to set the output sound level of the electronic device. That is, the user may say a user command of "Hey virtual assistant, match the sound level to my voice" at a particular sound level of 45 decibels (45 dB). In this case, the reference sound input may be the voice sound level of the user's spoken command. In other embodiments, the reference sound may be, for example, an artificial sound, such as may be produced by a device controlled by the user or not controlled by the user, an identifiable artificial sound in the environment and detectable by the virtual assistant application, the ambient environmental noise in the environment, such as the background noise level, etc. The user command may include a designation of the reference sound input using any words or designations that may be sufficient for the virtual assistant application to identify the intended reference sound input.

As shown by reference number 120, the electronic device may determine a sound level of the reference sound input. That is, the electronic device may determine that a sound level of the reference sound input is 45 decibels (dB).

As shown by reference number 130, the electronic device may set an output sound level of the electronic device based on the determined sound level of the reference sound input, and based on the user command. That is, the electronic device may set an output sound level of the electronic device to be 45 dB. In other words, the electronic device may set an output sound level of the electronic device to match the determined sound level at which the user command was spoken by the user.

As shown in FIG. 1, and by reference number 140, the electronic device may output sound at the output sound level. That is, the electronic device may output the response of "the volume is adjusted" at an output sound level of 45 dB. The electronic device may continue to output additional sound at the output sound level based on setting the output sound level.

In this way, the electronic device may set an output sound level of the electronic device based on a user command for a virtual assistant application of the electronic device to set the output sound level of the electronic device and a determined sound level of a reference sound input. Accordingly, the electronic device may output sound at an output sound level that more accurately aligns with a preferred, intended, or actual sound level of the user. As such, the user may set the output sound level of the electronic device by merely providing a user command at a desired sound level, or by providing a user command that identifies a reference sound input. Moreover, in this way, the foregoing technique reduces a number of instances in which the electronic device outputs sound at an output sound level that significantly differs from an actual sound level of a user, and/or reduces a number of instances in which a user is required to provide additional user commands requesting adjustment of the output sound level of the electronic device. Accordingly, the embodiments herein improve the functionality of electronic devices and virtual assistant applications thereof, and improve the utilization of computational resources of electronic devices and virtual assistant applications thereof.

Figure 2:
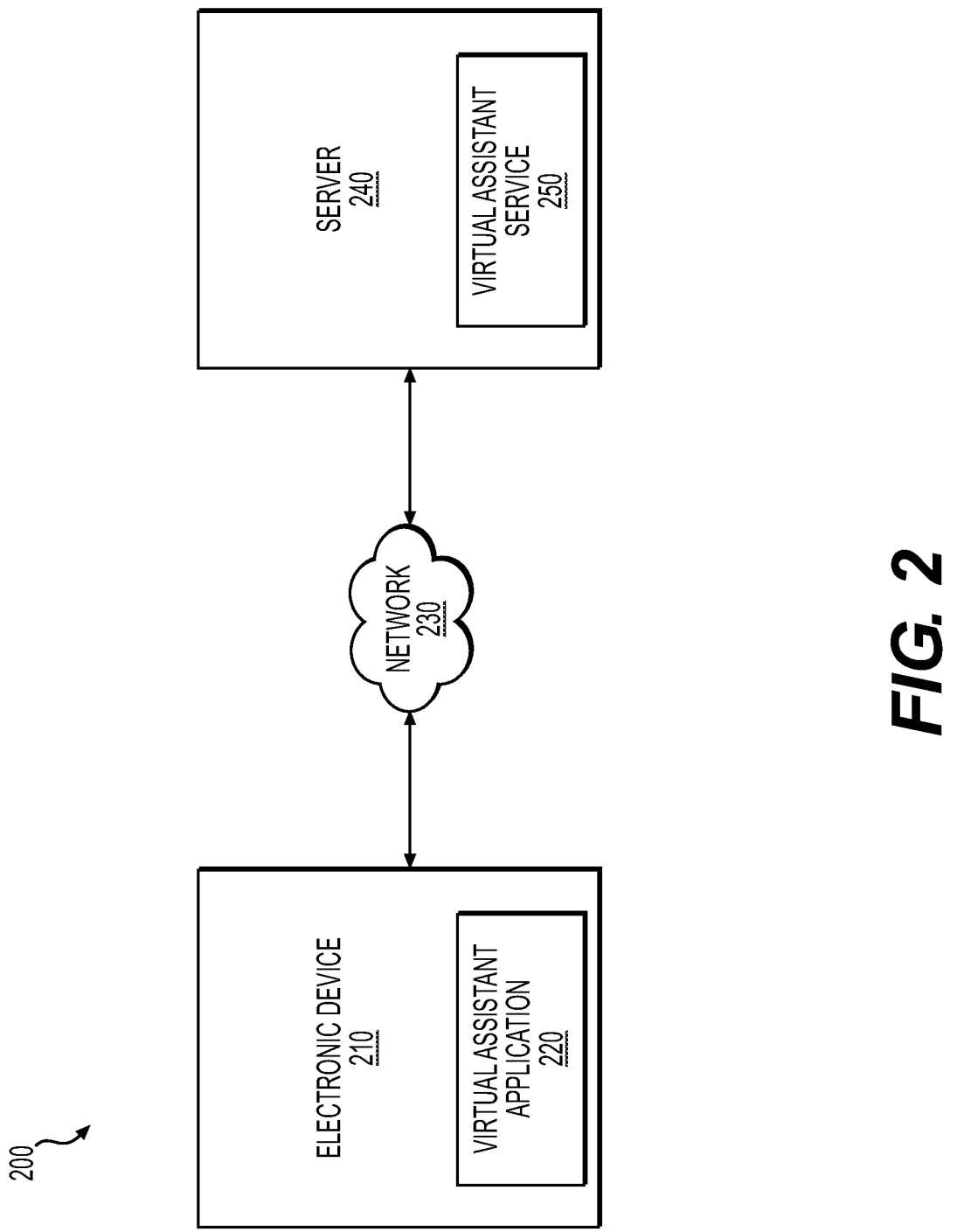
FIG. 2 is a diagram of an example system 200 for setting an output sound level of an electronic device based on a user command for a virtual assistant application of the electronic device to set the output sound level of the electronic device and a determined sound level of a reference sound input.

FIG. 2 is a diagram of an example system 200 for setting an output sound level of an electronic device based on a user command for a virtual assistant application of the electronic device to set the output sound level of the electronic device and a determined sound level of a reference sound input.

As shown in FIG. 2, the system 200 may include an electronic device 210, a virtual assistant application 220, a network 230, a server 240, and a virtual assistant service 250.

The electronic device 210 may be a smartphone, a smart speaker, a wearable device, a tablet computer, a laptop computer, a smart appliance, a desktop computer, etc. The electronic device 210 may store, access, and/or execute a virtual assistant application 220 that performs services, tasks, etc.

The network 230 may be a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The server 240 may be a server, a cloud server, etc. The server 240 may store, provides access to, and/or execute virtual assistant service 250 that performs services, tasks, etc. In some cases, one or more operations described herein as being performed by the virtual assistant application 220 of the electronic device 210 may alternatively be performed by the virtual assistant service 250 of the server 240.

The number and arrangement of the devices of the system 200 shown in FIG. 2 are provided as an example. In practice, the system 200 may include additional devices, fewer devices, different devices, or differently arranged devices than those shown in FIG. 2. Additionally, or alternatively, a set of devices (e.g., one or more devices) of the system 200 may perform one or more functions described as being performed by another set of devices of the system 200.

Figure 3:
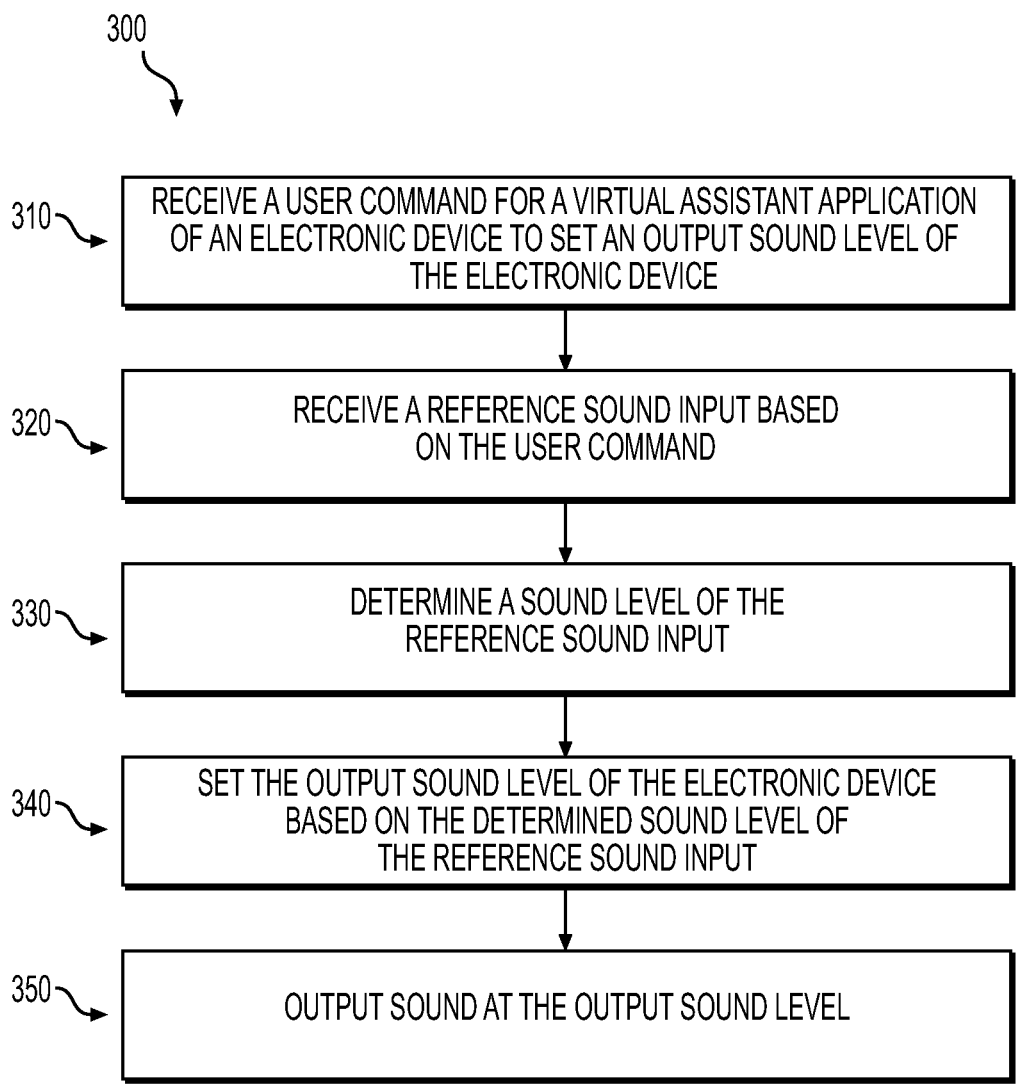
FIG. 3 is a flowchart of an example process 300 for setting an output sound level of an electronic device based on a user command for a virtual assistant application of the electronic device to set the output sound level of the electronic device and a determined sound level of a reference sound input.

FIG. 3 is a flowchart of an example process 300 for setting an output sound level of an electronic device based on a user command for a virtual assistant application of the electronic device to set the output sound level of the electronic device and a determined sound level of a reference sound input.

As shown in FIG. 3, the process 300 may include receiving a user command for a virtual assistant application of an electronic device to set an output sound level of the electronic device (operation 310), and receiving a reference sound input based on the user command (operation 320). For example, the electronic device 210 may receive a user command for the virtual assistant application 220 of the electronic device 210 to set an output sound level of the electronic device, and may receive a reference sound input based on the user command.

The user command may include a trigger word, a wake word, etc., for the virtual assistant application 220. For example, the user command may include a word that specifically identifies that the user command is intended for the virtual assistant application 220. Alternatively, the voice input might not include a trigger word, a wake word, etc.

The user command may include a word that identifies that the user intends to set the output sound level of the electronic device 210. For example, the user command might include a word, or phrase, such as "set," "adjust," "output sound level," "volume," "output," "sound," "level," "increase," "decrease," "quieter," "louder," "higher," "lower," "match my sound level," etc. Alternatively, the user command might not include any words that identify that the user intends to set the output sound level. For example, the user command might be "what is the weather today?"

The user command might not include a word that identifies a specific output sound level to which the output sound level of the electronic device is to be set. For example, the user command might be the phrase of "virtual assistant, adjust the volume."

The reference sound input may be any sound input received by the electronic device 210. For example, the user may speak the user command, and the electronic device 210 may receive the reference sound input based on the voice sound level of the user's spoken command. In other embodiments, the reference sound input may be, for example, an artificial sound, such as may be produced by a device controlled by the user or not controlled by the user, an identifiable artificial sound in the environment and detectable by the virtual assistant application, the ambient environmental noise in the environment, such as the background noise level, etc. The user command may include a designation of the reference sound input using any words or designations that may sufficient for the virtual assistant application to identify the intended reference sound input.

As further shown in FIG. 3, the process 300 may include determining a sound level of the reference sound input (operation 330). For example, the electronic device 210 may determine a sound level of the reference sound input, based on receiving the user command for the virtual assistant application 220 of the electronic device 210 to set the output sound level of the electronic device 210 and the reference sound input.

The sound level of the reference sound input may be a sound exposure level, a sound power level, a sound pressure level, a sound intensity level, a sound velocity level, a loudness level, a volume level, a noise level, or the like. In other words, the sound level may identify how loud, or quiet, the reference sound input is.

The electronic device 210 may determine the sound level based on measuring sound waves associated with the reference sound input. For example, the input component 650 (e.g., microphone) of the electronic device 210 may sample and measure sound waves associated with the reference sound input. Further, the electronic device 210 may determine the sound level based on the measured sound waves. As an example, the electronic device 210 may determine the sound level in units of decibels.

In the case where the reference sound input is the user command, the electronic device 210 may determine the sound level based on one or more words of the user command. For example, the electronic device 210 may determine the sound level based on every word of the user command, such as by determining an average sound level of the words of the user command. Alternatively, the electronic device 210 may determine the sound level based on less than the entire set of words of the user command, such as by determining the lowest sound level of a word of the user command, the greatest sound level of a word of the user command, an average sound level of a subset of the words of the user command (e.g., the last word, the last two words, etc.). The electronic device 210 may identify a particular word, or a set of words, based on predetermined information that identifies one or more particular words to be used to set the sound level.

As further shown in FIG. 3, the process 300 may include setting the output sound level of the electronic device based on the determined sound level of the reference sound input (operation 340). For example, the electronic device 210 may set an output sound level of the electronic device 210 based on the determined sound level of the reference sound input.

The output sound level of the electronic device 210 may be a sound exposure level, a sound power level, a sound pressure level, a sound intensity level, a sound velocity level, a loudness level, a volume level, a noise level, or the like. In other words, the output sound level may identify how loud, or quiet, sound output by the electronic device 210 is.

The electronic device 210 may set the output sound level of the electronic device 210 to match the determined sound level of the reference sound input. For example, if the determined sound level of the reference sound input is 60 dB, then the electronic device 210 may set the output sound level of the electronic device 210 to be 60 dB.

Alternatively, the electronic device 210 may set the output sound level of the electronic device 210 to an output sound level that is similar to, but does not exactly match, the determined sound level of the reference sound input. For example, if the determined sound level of the reference sound input is 60 dB, then the electronic device 210 may set the output sound level of the electronic device 210 to be 50 dB, 65 dB, 62 dB, etc.

Alternatively, the electronic device 210 may set the output sound level of the electronic device 210 to a relative output sound level that is relative to the determined sound level of the reference sound input. For example, if the determined sound level of the reference sound input is approximately as loud as the user's voice is capable of being, then the electronic device 210 may set the output sound level of the electronic device 210 to a maximum sound level of the electronic device 210. As another example, if the determined sound level of the reference sound input is approximately as quiet as the user's voice is capable of being while remaining detectable, then the electronic device 210 may set the output sound level of the electronic device 210 to a minimum sound level of the electronic device 210. In this way, the electronic device 210 may set the output sound level of the electronic device 210 to a sound level that is relative to a sound level of the user's voice. For instance, the maximum sound level of the user's voice might not correspond to a maximum sound level of the electronic device 210, and the minimum sound level of the user's voice might not correspond to a minimum sound level of the electronic device 210. In other words, the electronic device 210 might be capable of outputting sound at an output sound level that the user is not capable of replicating with the user's voice. By determining that the sound level of the reference sound input is a maximum sound level that the user is capable of generating, the electronic device 210 may set the output sound level to a maximum sound level of the electronic device 210 despite the user not being capable of speaking that loudly.

The electronic device 210 may store mapping information that maps a sound level of the user's voice to a relative output sound level of the electronic device 210. For example, the mapping information may map a maximum sound level of the user's voice to a maximum output sound level of the electronic device 210. In this case, the maximum sound level of the user's voice might be different (e.g., less than) the maximum output sound level of the electronic device 210. The mapping information may be specific to a particular user. In this case, the electronic device 210 may prompt the user to provide voice inputs at various sound levels (e.g., maximum possible, minimum possible, intermediate, etc.), and may generate the mapping information based on the received voice inputs. Alternatively, the mapping information may be generalized to a set of users. For example, the mapping information may be generated based on general physiology, based on machine learning techniques, based on generalized models, etc.

The electronic device 210 may store a set of predetermined output sound levels, select a predetermined output sound level from the set of predetermined output sound levels based on the determined sound level of the reference sound input, and set the output sound level of the electronic device 210 to the selected predetermined output sound level. For example, the electronic device 210 may store predetermined output sound levels of 30 dB, 40 dB, 50 dB, 60 dB, etc.

The electronic device 210 may select a predetermined output sound level that is most similar to the determined sound level of the reference sound input, and set the output sound level of the electronic device 210 to the predetermined output sound level. For example, if the determined sound level of the reference sound input is 43 dB, then the electronic device 210 may select the closest predetermined output sound level (e.g., 40 dB) from the set of predetermined output sound levels, and set the output sound level of the electronic device 210 to the closest predetermined output sound level.

Alternatively, the electronic device 210 may select a predetermined output sound level corresponding to a threshold sound level based on determining that the determined sound level of the reference sound input satisfies the threshold sound level, and set the output sound level of the electronic device 210 to the predetermined output sound level. For example, based on the determined sound level (e.g., 43 dB) of the reference sound input being greater than a threshold sound level (e.g., 40 dB), the electronic device 210 may set the output sound level of the electronic device 210 to the threshold sound level (e.g., 40 dB). As another example, based on the determined sound level (e.g., 23 dB) of the reference sound input being less than a threshold sound level (e.g., 35 dB), the electronic device 210 may set the output sound level of the electronic device 210 to the threshold sound level (e.g., 35 dB).

Alternatively, the electronic device 210 may select a predetermined output sound level corresponding to a predetermined range within which the determined sound level of the reference sound input lies, and set the output sound level of the electronic device 210 to the predetermined output sound level. For example, the electronic device 210 may determine that the determined sound level (e.g., 43 dB) of the reference sound input is within a predetermined range (e.g., 40 dB to 50 db), select a predetermined output sound level (e.g., 45 dB) corresponding to the predetermined range, and set the output sound level of the electronic device 210 to the predetermined output sound level (e.g., 45 dB) corresponding to the predetermined range.

Alternatively, the electronic device 210 may set the output sound level of the electronic device 210 based on the determined sound level of the reference sound input and an offset value. For example, the offset value may be +5 dB, +10 dB, −5 dB, −10 dB, etc. In this case, the electronic device 210 may determine the sound level of the reference sound input (e.g., 30 dB), adjust the determined sound level using the offset value (e.g., +5 dB), determine the output sound level of the electronic device 210 based on adjusting the determined sound level using the offset value (e.g., 30 dB+5 dB=35 dB), and set the output sound level of the electronic device 210 using the determined output sound level of the electronic device 210 (e.g., 35 dB).

Alternatively, the electronic device 210 may set the output sound level of the electronic device 210 based on the determined sound level of the reference sound input and based on the user command. For example, the electronic device 210 may set the output sound level of the electronic device 210 to be greater, equal to, or less than the determined sound level of the reference sound input, based on the particular user command. As an example, if the user command indicates that the output sound level of the electronic device 210 is to be set greater than the determined sound level of the voice of the user, then the electronic device 210 may set the output sound level of the electronic device 210 to be greater than the determined sound level of the voice of the user.

Alternatively, the electronic device 210 may set the output sound level of the electronic device 210 based on the determined sound level of the reference sound input and a machine learning model. The machine learning model may be a neural network, a decision tree, a support-vector machine, a Bayesian network, or the like. The electronic device 210 may receive a trained machine learning model from the server 240, and store the trained machine learning model. Alternatively, the electronic device 210 may train the machine learning model, and store the trained machine learning model.

The electronic device 210 may input the determined sound level of the reference sound input to the machine learning model, determine the output sound level of the electronic device 210 based on an output of the machine learning model, and set the output sound level of the electronic device 210 based on the determined output sound level. For example, the electronic device 210 may input a determined sound level (e.g., 43 dB) of the reference sound input to a machine learning model, and determine a output sound level (e.g., 55 dB) of the electronic device 210 based on an output of the machine learning model.

The machine learning model may correspond to a particular user of the electronic device 210. For example, the machine learning model may be trained based on user commands of a particular user and feedback information collected based on setting the output sound level of the electronic device 210 based on the user commands of the particular user. As an example, if the electronic device 210 sets an output sound level (e.g., 45 dB) of the electronic device 210 based on a determined sound level (e.g., 43 dB) of the reference sound input, but the user manually increases the output sound level from the set output sound level, then the machine learning model may be trained to identify that the user prefers a higher output sound level. In this case, the machine learning model may be trained, or updated, to determine an output sound level of the electronic device 210 that more accurately aligns with the preferred output sound level of the user. As another example, if the electronic device 210 sets an output sound level (e.g., 45 dB) of the electronic device 210 based on a determined sound level (e.g., 43 dB) of the reference sound input, and the user does not manually increase the output sound level from the determined and set output sound level, then the machine learning model may be trained to identify that the determined and set output sound level is acceptable to the user. In either case, the feedback information may include information that identifies whether, and how much, a user adjusts the output sound level of the electronic device 210 after the electronic device 210 determines and sets the output sound level of the electronic device 210 based on the determined sound level of the user command.

The electronic device 210 may set the output sound level of the electronic device 210 based on the determined sound level of the reference sound input and an ambient sound level of an environment in which the electronic device 210 is located. For example, the electronic device 210 may determine an ambient sound level of the environment in which the electronic device 210 is located, determine the sound level of the reference sound input, determine the output sound level of the electronic device 210 based on the ambient sound level and the determined sound level of the reference sound input, and set the output sound level of the electronic device 210. As an example, if the electronic device 210 is located in a relatively noisy environment, then the electronic device 210 might determine a relatively higher output sound level of the electronic device 210 than as compared to a situation in which the electronic device 210 is located in a relatively quieter environment.

The electronic device 210 may set the output sound level of the electronic device 210 based on the determined sound level of the reference sound input and one or more additional factors. For example, the one or more additional factors may include a time of day, a day of the week, a day of the year, an application that is being executed by the electronic device 210, content that is being output by the electronic device 210, a user of the electronic device 210, a number of other users in the vicinity of the electronic device 210, a geolocation of the electronic device 210, a velocity of the electronic device 210, or the like.

In any event, the electronic device 210 may determine and set the output sound level of the electronic device 210 based on the determined sound level of the reference sound input.

As further shown in FIG. 3, the process 300 may include outputting sound at the output sound level (operation 350). For example, the electronic device 210 may output sound at the output sound level, based on setting the output sound level.

As an example, if the user command of the user was a query for the virtual assistant application 220, then the electronic device 210 may output a response at the output sound level. In this way, the output sound level of the response of the virtual assistant application 220 may be similar to the voice sound level of the user command of the user. Accordingly, an output sound level of the dialogue between the user and the virtual assistant application 220 may more accurately resemble a natural conversation because both of the speech of the user and the speech of the virtual assistant application 220 have a similar sound level.

As another example, if the user command was an instruction for the virtual assistant application 220 to adjust an output sound level of music that is being played by the electronic device 210, then the electronic device 210 may output the music at the output sound level. In this way, the output sound level of the music played by the electronic device 210 may be similar to the output sound level of the user command.

After outputting sound at the output sound level, the electronic device 210 may receive feedback information from the user. For example, if the user manually adjusts the output sound level of the electronic device 210 after the electronic device 210 outputs sound at the set output sound level, then the electronic device 210 may generate feedback information identifying that the output sound level was adjusted. As another example, if the user does not manually adjust the output sound level of the electronic device 210 after the electronic device 210 outputs sound at the set output sound level, then the electronic device 210 may generate feedback information identifying that the output sound level was not adjusted. The electronic device 210 may update the machine learning model described elsewhere herein based on the feedback information, or may provide the feedback information to the server 240 for updating the machine learning model. In this way, the electronic device 210 may determine subsequent output sound levels of the electronic device 210 that more accurately align with a preferred, or intended, output sound level of the user.

Although FIG. 3 shows example operations of the process 300, the process 300 may include additional operations, fewer operations, different operations, or differently arranged operations than those depicted in FIG. 3. Additionally, or alternatively, two or more of the operations of the process 300 may be performed in parallel. Moreover, one or more operations of the process 300 may be performed by the server 240 instead of, or in addition to, the electronic device 210.

Figure 4:
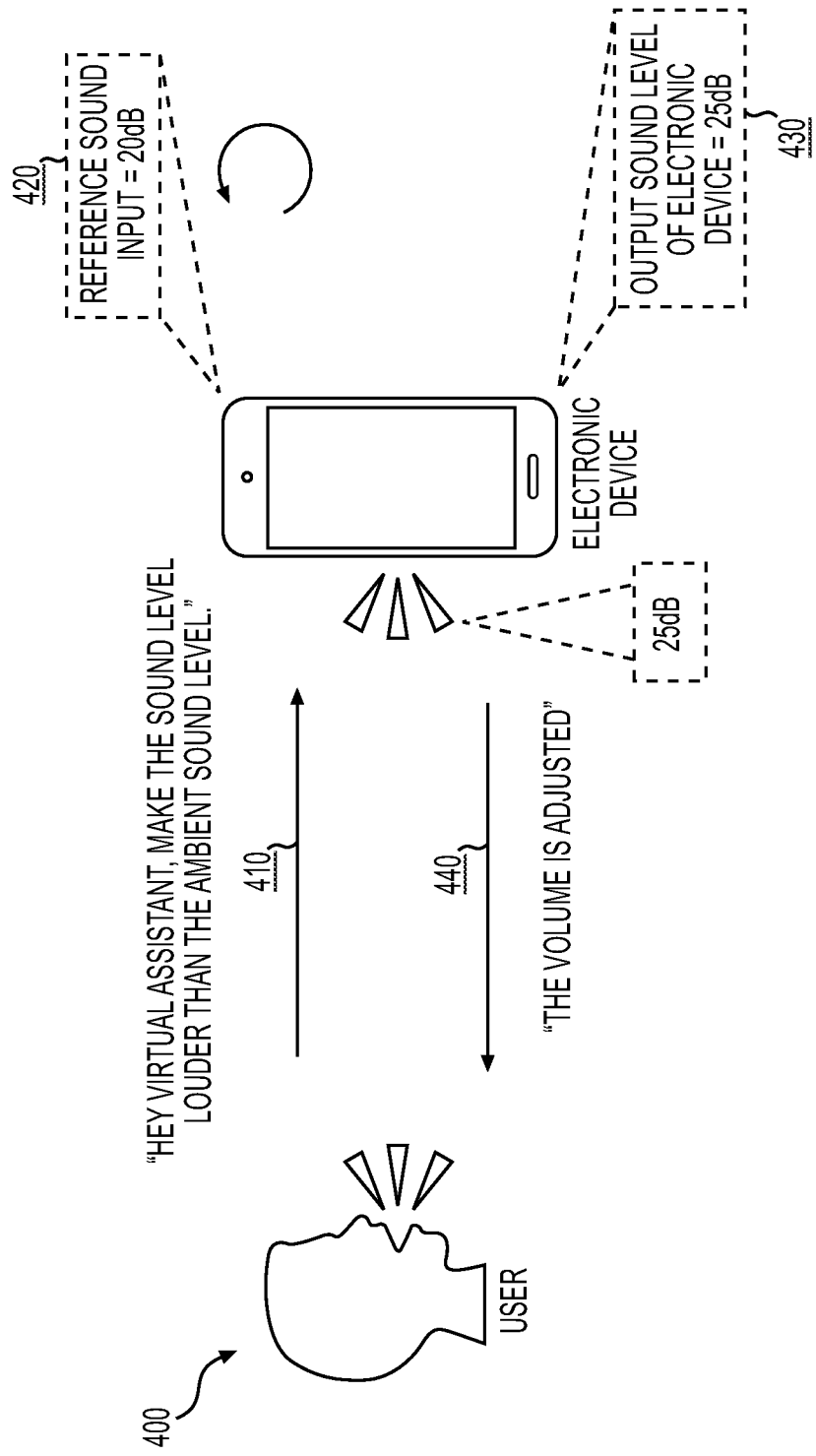
FIG. 4 is a diagram of an overview 400 for setting an output sound level of an electronic device based on a user command for a virtual assistant application of the electronic device to set the output sound level of the electronic device and a determined sound level of a reference sound input.

FIG. 4 is a diagram of an overview 400 for setting an output sound level of an electronic device 210 based on a user command for a virtual assistant application 220 of the electronic device 210 to set the output sound level of the electronic device 210 and a determined sound level of a reference sound input.

As shown by reference number 410, the electronic device may receive a user command for a virtual assistant application 220 of the electronic device 210 to set the output sound level of the electronic device 210. That is, the user may say a user command of "Hey virtual assistant, make the sound level louder than the ambient sound level." In this case, the reference sound input may be the ambient sound level.

As shown by reference number 420, the electronic device 210 may receive a sound level of the reference sound input. For instance, the electronic device 210 may determine a sound level of the ambient sound level as being 20 dB.

As shown by reference number 430, the electronic device 210 may set an output sound level of the electronic device 210 based on the determined sound level of the reference sound input and based on the user command. That is, the electronic device may set an output sound level of the electronic device to be 25 dB, based on the user command to make the output sound level louder than the ambient sound level.

As shown by reference number 440, the electronic device 210 may output sound at the output sound level. That is, the electronic device 210 may output the response of "the volume is adjusted" at an output sound level of 25 dB. The electronic device 210 may continue to output additional sound at the output sound level based on setting the output sound level.

Figure 5:
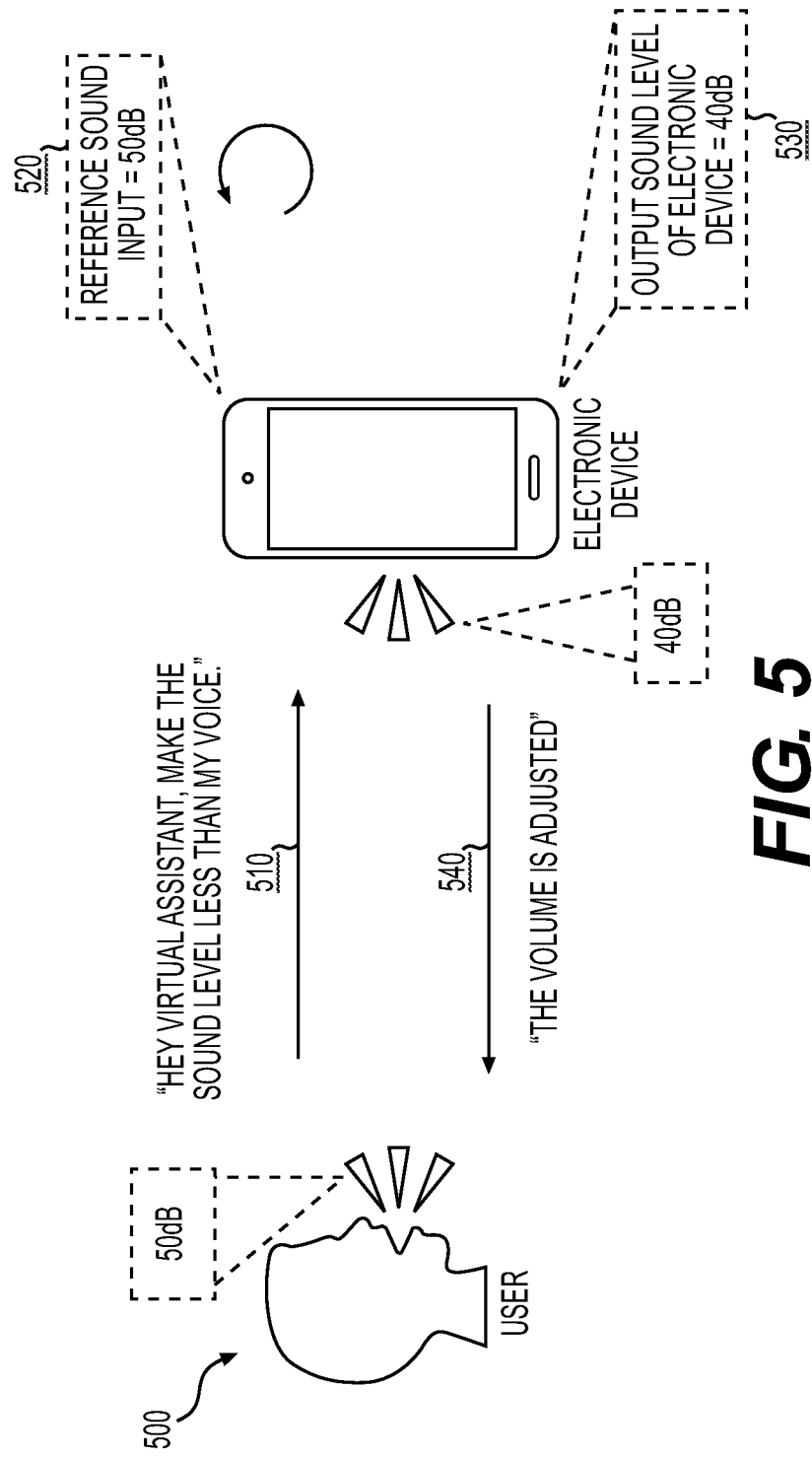
FIG. 5 is a diagram of an overview 500 for setting an output sound level of an electronic device based on a user command for a virtual assistant application of the electronic device to set the output sound level of the electronic device and a determined sound level of a reference sound input.

FIG. 5 is a diagram of an overview 500 for setting an output sound level of an electronic device 210 based on a user command for a virtual assistant application 220 of the electronic device 210 to set the output sound level of the electronic device 210 and a determined sound level of a reference sound input.

As shown by reference number 510, the electronic device 210 may receive a user command for a virtual assistant application 220 of the electronic device 210 to set the output sound level of the electronic device 210. That is, the user may say a user command of "Hey virtual assistant, make the sound level less than my voice" at a particular sound level of 50 dB. In this case, the reference sound input may be the user command.

As shown by reference number 520, the electronic device 210 may determine a sound level of the reference sound input. That is, the electronic device may determine that a sound level of the reference sound input is 50 dB.

As shown by reference number 530, the electronic device 210 may set an output sound level of the electronic device 210 based on the determined sound level of the reference sound input, and based on the user command. That is, the electronic device 210 may set an output sound level of the electronic device 210 to be 40 dB. In other words, the electronic device 210 may set an output sound level of the electronic device 210 to be less than the output sound level at which the user command was spoken by the user.

As shown by reference number 540, the electronic device may output sound at the output sound level. That is, the electronic device may output the response of "the volume is adjusted" at an output sound level of 40 dB. The electronic device 210 may continue to output additional sound at the output sound level based on setting the output sound level.

Figure 6:
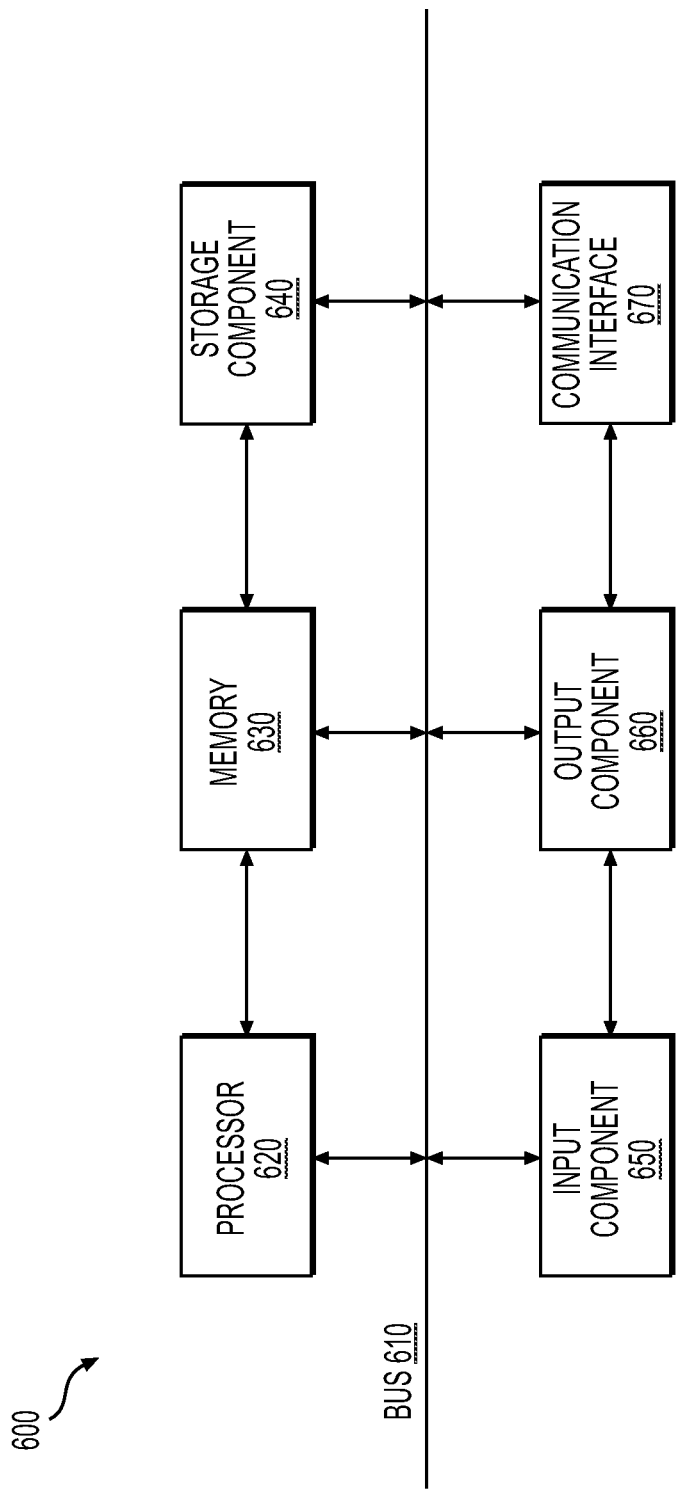
FIG. 6 is a diagram of example components of a device 600.

FIG. 6 is a diagram of example components of a device 600. The device 600 may correspond to the electronic device 210 and/or the server 240. As shown in FIG. 6, the device 600 may include a bus 610, a processor 620, a memory 630, a storage component 640, an input component 650, an output component 660, and a communication interface 670.

The bus 610 includes a component that permits communication among the components of the device 600. The processor 620 may be implemented in hardware, firmware, or a combination of hardware and software. The processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component.

The processor 620 may include one or more processors capable of being programmed to perform a function. The memory 630 may include a random access memory (RAM), a read only memory (ROM), and/or another type of dynamic or static storage device (e.g., a flash memory, a magnetic memory, and/or an optical memory) that stores information and/or instructions for use by the processor 620.

The storage component 640 may store information and/or software related to the operation and use of the device 600. For example, the storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 650 may include a component that permits the device 600 to receive information, such as via user input (e.g., a touch screen display, a keyboard, a keypad, a mouse, a button, a switch, and/or a microphone for receiving the reference sound input). Additionally, or alternatively, the input component 650 may include a sensor for sensing information (e.g., a global positioning system (GPS) component, an accelerometer, a gyroscope, and/or an actuator). The output component 660 may include a component that provides output information from the device 600 (e.g., a display, a speaker for outputting sound at the output sound level, and/or one or more light-emitting diodes (LEDs)).

The communication interface 670 may include a transceiver-like component (e.g., a transceiver and/or a separate receiver and transmitter) that enables the device 600 to communicate with other devices, such as via a wired connection, a wireless connection, or a combination of wired and wireless connections. The communication interface 670 may permit the device 600 to receive information from another device and/or provide information to another device. For example, the communication interface 670 may include an Ethernet interface, an optical interface, a coaxial interface, an infrared interface, a radio frequency (RF) interface, a universal serial bus (USB) interface, a Wi-Fi interface, a cellular network interface, or the like.

The device 600 may perform one or more processes described herein. The device 600 may perform these processes based on the processor 620 executing software instructions stored by a non-transitory computer-readable medium, such as the memory 630 and/or the storage component 640. A computer-readable medium may be defined herein as a non-transitory memory device. A memory device may include memory space within a single physical storage device or memory space spread across multiple physical storage devices.

The software instructions may be read into the memory 630 and/or the storage component 640 from another computer-readable medium or from another device via the communication interface 670. When executed, the software instructions stored in the memory 630 and/or the storage component 640 may cause the processor 20 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of the components shown in FIG. 6 are provided as an example. In practice, the device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

As described above, some embodiments herein provide an electronic device that sets an output sound level of the electronic device based on a user command for a virtual assistant application of the electronic device to set the output sound level of the electronic device and a determined sound level of a reference sound input. Accordingly, the electronic device may output sound at an output sound level that more accurately aligns with a preferred, intended, or actual sound level of the user. As such, the user may set the output sound level of the electronic device by merely providing a user command at a desired sound level, or by identifying a reference sound input. Moreover, in this way, the foregoing technique reduces a number of instances in which the electronic device outputs sound at an output sound level that significantly differs from an actual, intended, or desired sound level of a user, and/or reduces a number of instances in which a user is required to provide additional user commands requesting adjustment of the output sound level of the electronic device. Accordingly, the embodiments herein improve the functionality of electronic devices and virtual assistant applications thereof, and improve the utilization of computational resources of electronic devices and virtual assistant applications thereof.

While principles of the present disclosure are described herein with reference to example embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description.

We claim:

1. An electronic device comprising:
a memory configured to store instructions; and
a processor configured to execute the instructions to:
receive a user command for a virtual assistant application of the electronic device to set an output sound level of the electronic device;
receive a reference sound input, wherein the reference sound input is a voice sound level of the user command;
determine the voice sound level of the reference sound input; and
set the output sound level of the electronic device based on the determined voice sound level of the reference sound input.

2. The electronic device according to claim 1, wherein the processor is further configured to:
output sound at the output sound level, based on setting the output sound level of the electronic device.

3. The electronic device according to claim 1, wherein the reference sound input is the user command, and wherein the processor is further configured to:
set the output sound level of the electronic device to match the sound level of the user command.

4. The electronic device according to claim 1, wherein the processor is further configured to:
determine that the determined sound level of the reference sound input satisfies a threshold sound level; and
set the output sound level of the electronic device, based on determining that the determined sound level of the reference sound input satisfies the threshold sound level.

5. The electronic device according to claim 1, wherein the processor is further configured to:
determine that the determined sound level of the reference sound input is within a predetermined range; and
set the output sound level of the electronic device to a predetermined sound level corresponding to the predetermined range, based on determining that the determined sound level of the reference sound input is within the predetermined range.

6. The electronic device according to claim 1, wherein the user command does not identify a specific output sound level to which the output sound level of the electronic device is to be set.

7. The electronic device according to claim 1, wherein the reference sound input is an ambient sound, and wherein the processor is further configured to:
set the output sound level of the electronic device based on the sound level of the ambient sound.

8. A method comprising:
receiving a user command for a virtual assistant application of an electronic device to set an output sound level of the electronic device;
receiving a reference sound input, wherein the reference sound input is a voice sound level of the user command;
determining the voice sound level of the reference sound input; and
setting the output voice sound level of the electronic device based on the determined sound level of the reference sound input.

9. The method according to claim 8, wherein the method further comprises:
    outputting sound at the output sound level, based on setting the output sound level of the electronic device.

10. The method according to claim 8, wherein the reference sound input is the user command, and wherein the method further comprises:
    setting the output sound level of the electronic device to match the sound level of the user command.

11. The method according to claim 8, wherein the method further comprises:
    determining that the determined sound level of the reference sound input satisfies a threshold sound level; and
    setting the output sound level of the electronic device, based on determining that the determined sound level of the reference sound input satisfies the threshold sound level.

12. The method according to claim 8, wherein the method further comprises:
    determining that the determined sound level of the reference sound input is within a predetermined range; and
    setting the output sound level of the reference sound input to a predetermined sound level corresponding to the predetermined range, based on determining that the determined sound level of the reference sound input is within the predetermined range.

13. The method according to claim 8, wherein the user command does not identify a specific output sound level to which the output sound level of the electronic device is to be set.

14. The method according to claim 8, wherein the reference sound input is an ambient sound, and wherein the method further comprises:
    setting the output sound level of the electronic device based on the sound level of the ambient sound.

15. A non-transitory computer-readable medium storing instructions that, when executed by a processor of an electronic device, cause the processor to:
    receive a user command for a virtual assistant application of the electronic device to set an output sound level of the electronic device;
    receive a reference sound input based, wherein the reference sound input is a voice sound level of the user command;
    determine the voice sound level of the reference sound input; and
    set the output sound level of the electronic device based on the determined voice sound level of the reference sound input.

16. The non-transitory computer-readable medium according to claim 15, wherein the instructions further cause the processor to:
    output sound at the output sound level, based on setting the output sound level of the electronic device.

17. The non-transitory computer-readable medium according to claim 15, wherein the instructions further cause the processor to:
    set the output sound level of the electronic device to be different than the determined sound level of the reference sound input.

18. The non-transitory computer-readable medium according to claim 15, wherein the reference sound input is an ambient sound, and wherein the instructions further cause the processor to:
    set the output sound level of the electronic device based on the sound level of the ambient sound.

19. The non-transitory computer-readable medium according to claim 15, wherein the reference sound input is the user command, and wherein the instructions further cause the processor to:
    set the output sound level of the electronic device to match the sound level of the user command.

20. The non-transitory computer-readable medium according to claim 15, wherein the instructions further cause the processor to:
    determine that the determined sound level of the reference sound input satisfies a threshold sound level; and
    set the output sound level of the electronic device, based on determining that the sound level of the reference sound input satisfies the threshold sound level.

* * * * *